(12) United States Patent
Midgley (10) Patent No.: US 7,213,038 B2
(45) Date of Patent: May 1, 2007

(54) DATA SYNCHRONIZATION BETWEEN DISTRIBUTED COMPUTERS

(75) Inventor: Nicholas James Midgley, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/902,361

(22) Filed: Jul. 29, 2004

(65) Prior Publication Data

US 2005/0080796 A1   Apr. 14, 2005

(30) Foreign Application Priority Data

Oct. 10, 2003   (GB) ................. 0323780.7

(51) Int. Cl.
G06F 12/00 (2006.01)
G06F 17/30 (2006.01)

(52) U.S. Cl. ............... 707/201; 707/8; 707/10; 707/204

(58) Field of Classification Search ........... 707/2, 707/3, 8, 10, 100, 101, 103 R, 104.1, 200, 707/201, 204; 709/200–203, 205, 219, 229, 709/231; 719/310, 315, 317
See application file for complete search history.

(56) References Cited

U.S. PATENT DOCUMENTS

| | | | |
|---|---|---|---|
| 5,721,825 A * | 2/1998 | Lawson et al. ............. 709/203 |
| 5,724,575 A * | 3/1998 | Hoover et al. ............. 707/10 |
| 5,872,969 A * | 2/1999 | Copeland et al. .......... 718/101 |
| 5,940,827 A * | 8/1999 | Hapner et al. ............. 707/8 |
| 6,044,381 A * | 3/2000 | Boothby et al. ........... 707/201 |
| 6,212,529 B1 * | 4/2001 | Boothby et al. ........... 707/201 |
| 6,253,228 B1 * | 6/2001 | Ferris et al. ............. 709/203 |
| 6,438,582 B1 * | 8/2002 | Hsiao et al. .............. 709/206 |
| 6,449,622 B1 * | 9/2002 | LaRue et al. ............. 707/201 |
| 6,466,951 B1 * | 10/2002 | Birkler et al. ............ 707/201 |
| 6,633,862 B2 * | 10/2003 | Thompson ............... 707/1 |
| 7,069,267 B2 * | 6/2006 | Spencer, Jr. ............. 707/10 |
| 2002/0188610 A1 | 12/2002 | Spencer ................. 707/10 |
| 2003/0028683 A1 * | 2/2003 | Yorke et al. ............. 709/315 |

OTHER PUBLICATIONS

Anna Hoc: File placement and process assignment due to resource sharing in a distributed system, year 1985, ACM Press, ISBN: 0-911801-07-3, pp. 481-492.*

Matthew J. Weinstein et al.: Transaction and Synchronization in a Distributed Operating Syatem, Dec. 1985, ACM Press, vol. 19, Issue 5, pp. 115-126.*

* cited by examiner

*Primary Examiner*—Greta Robinson
*Assistant Examiner*—Jacques Veillard
(74) *Attorney, Agent, or Firm*—Arthur J. Samodovitz (57) ABSTRACT

Apparatus, method and program for maintaining common data in first, second and third datasets in first, second and third respective computer systems. The first computer system is assigned a sole right to approve updates of the common data while able, and a second computer system is assigned a right to approve updates of the common data when the first computer system is unable. The third computer system subsequently makes a request to the first computer system to update the common data, and in response, the first computer system updates the common data in the first dataset and advises the second and third computer systems to make a corresponding update to their second and third datasets, respectively.

17 Claims, 11 Drawing Sheets

DATA SYNCHRONIZATION BETWEEN DISTRIBUTED COMPUTERS

BACKGROUND OF THE INVENTION

The invention relates generally to computer systems, and deals more particularly with synchronization of data between distributed computer systems.

The Internet is an example of a distributed computer system comprising computers and computer networks of different types. Networks, such as mobile phone networks, corporate intranets and home networks, can also exist outside the Internet. Within all of these networks, computers and other devices can communicate with one another and share resources despite their geographic separation. Such resources may include printers, disk drives, data files, databases and other data objects.

To allow the sharing of a resource, a computer program executing on a computer communicates with other computers by passing messages. For example, a client using HyperText Transfer Protocol (HTTP) specifies a server's URL in a message to request a resource. Then, the server looks up the path name of the requested resource. If the resource exists, the server accesses the resource and sends back the requested data in a reply message to the client device.

One example of a distributed system is a cluster or group of servers which all provide the same service/application using the same data to provide load balancing and/or redundancy. In a distributed system it is likely that more than one client device will occasionally want to access the same shared resource at approximately the same time. For proper operation, access to the resource must be synchronised such that the proper data is read or written. The data must be consistent throughout the distributed system. The problem is compounded by large volumes of transactions, when communication times are extended, and when fast performance and high availability are desired.

Web service providers and suppliers currently have a distributed model in the implementation of a web service. One or more web services are deployed across a number of geographically dispersed physical environments. At the same time, each of these physical environments requires a consistent view of some of the data that is common to the web services. This has proven difficult to both synchronize data among the implemented web services and allow multiple systems to update the same data.

In order to update data across multiple servers, it was known to employ a "two phase commit" protocol. This protocol allows all of the servers involved in a transaction to either accept an update or to rollback an update, thereby maintaining consistent data. To achieve this, one of the servers takes on a coordinator role to ensure the same outcome on all the serves. In phase commit, a client device sends a request to commit or rollback a transaction to the coordinator server. The coordinator server forwards the request to all other servers which maintain the same data. If the request from any participating server is to abort, i.e. not enter a transaction, the coordinator informs all other participating servers to roll back the transaction before it is considered entered. If the request from a server is to commit a transaction, the coordinator sends a request to all the other participating servers asking if they are prepared to commit the transaction. If a participating server can commit the transaction, it will commit as soon as the appropriate records have been updated in permanent storage and the participating server is prepared to commit.

A disadvantage of using two phase commit is that it requires all the participating servers to support the two phase commit protocol. Even if the participating servers all support the two phase commit protocol, there may be differences in implementation between different vendor solutions across multiple physical environments.

U.S. patent application publication 2002/0188610 discloses a data storage and access system employing clustering. A data management system comprises a plurality of application servers, web servers and data servers. The data management system also includes a session manager directing users accessing the system to a subset of web servers, application servers and data server's based on the characteristics of the users.

U.S. patent application publication 2002/0188610 discloses that there are two forms of replication strategies, master-slave and master-master mode. Each has its own conflict resolution algorithm and work delegation technique. The data exists in two different computer systems at the same time.

An object of the present invention is to effectively synchronize data in a distributed computing environment, such as a load balanced environment.

SUMMARY OF THE INVENTION

The present invention resides in a method for maintaining common data in first, second and third datasets in first, second and third respective computer systems. The first computer system is assigned a sole right to approve updates of the common data while the first computer system is able to approve updates of the common data. A second computer system is assigned a right to approve updates of the common data when the first computer system is unable to approve updates of the common data. The third computer system subsequently makes a request to the first computer system to update the common data, and in response, the first computer system updates the common data in the first dataset and advises the second and third computer systems to make a corresponding update to their second and third datasets, respectively. The third computer system makes a subsequent request to the first computer system to update the common data, and in response, the third computer system learns that the first computer system is unable to approve updates of the common data and determines that the second computer system has a right to approve updates of the common data when the first computer system is unable to approve updates of the common data. In response, the third computer system makes a request to the second computer system to update the common data and notify the second computer system that the first computer system is unable to approve updates of the common data or that the second computer system has the right to update the common data. In response to the notification, the second computer system updates the common data in the second dataset and advises the third computer system to make a corresponding update to the third dataset.

Preferably a database broker program is included within each computer system to manage the database updates. The database broker is implemented as an application middleware service, interfacing to the application layer and application server which in turn requires access to the common data. The invention operates independently of the underlying database management program, and is therefore not restricted to certain vendor products. This enables customers to deploy global load balancing solutions with any database technology and removes the need to implement complex two-phase commit processing at the physical database level, and instead provides application level distribution and aggregation. The invention further enables scalability up to multiple sites, beyond simply dual site implementations.

In order for a database broker to have a 'global view' of the data, each database broker is provided with a copy of each dataset. Although each database broker is able to view all of the data required to provide the web service, each database broker is given ownership of a dataset that only it can update. In order to update a dataset, the update is packaged and sent to the owning database broker of the dataset. The owning database broker will validate and coordinate the update, for example, when simultaneous updates are issued by one or more database brokers competing to update the same resource. Once the owner is satisfied and has processed the update itself, an acknowledgement will be returned to a requesting broker, and only then will an update be performed.

Advantageously, each dataset within the update/retrieval database is divided into common data or local data. A database broker registers itself at server initialization time as a master database broker or a secondary database broker depending if a master database broker has already been elected and flags its status as active. The common data comprises data that is critical to all servers for example, the amount of stock available. The common data needs to be replicated across all websites with read access by the database brokers. Preferably a master database broker is designated as the owner of the common database and it is only the master database broker that can update the common dataset. Preferably at least one secondary database broker is designated as the owner of a dataset within a local database. A local database comprises data that is relevant to a geographical region for example details of the names and addresses of a plurality of U.S. customers. Additionally the local database may comprise data which is mastered locally by a database broker, and that does not form part of the common dataset. The local data will also need to be replicated across all services with read access by the database brokers.

The present invention provides for a monitoring routine probing at least one of the database brokers to determine if the database broker is still active. It is possible for a database broker to become inactive due to failures in the system such as a server crash. If so, the database broker is removed from a list storing the details about each active database broker registered in the system.

An advantage of the invention is that it is self optimising. If the monitoring routine detects that a database broker is failing, a further check is performed to determine if the database broker is a master database broker. If the response is positive, a lookup is performed in a configuration database or other data store to determine whether there is a delegate database broker defined to 'take over' as the master database broker from the inactive master database broker. This provides an advantage in that any number of 'chains of command' can be defined if a master database broker fails, ensuring the high availability of the web service. The chain of command may be extended to any number of secondary database brokers as well as a master database broker. It is further possible for a database broker to be a master database broker as well as a secondary broker.

Preferably a database broker maintains a log of the most performed queries held in its cache and uses the log to identify the most common queries performed. The database broker pre-loads this data into the cache when the broker registers in the system. The master broker aggregates the most common queries from all participating brokers, and propagates this information around all database brokers so that the entire system may be pre-loaded with the most common query data on a restart.

The invention also resides in a distributed computer system, method and program for maintaining common data in first and second datasets in first and second respective computer systems. The first computer system is assigned a sole right to approve updates of said common data while the first computer system is able to approve updates of the common data. The second computer system is assigned a right to approve updates of the common data when the first computer system is unable to approve updates of the common data. The second computer system subsequently makes a request to the first computer system to update the common data. In response, the first computer system updates the common data in the first dataset and advises the second computer system to make a corresponding update to the second dataset. The second computer system makes a subsequent request to the first computer system to update the common data. In response, the second computer system learns that the first computer system is unable to approve updates of the common data and determines that the second computer system has a right to approve updates of the common data when the first computer system is unable to approve updates of the common data. In response, the second computer system updates the common data in the second data set corresponding to the subsequent request.

The present invention can be implemented as a computer program product comprising computer program code stored on a computer readable storage medium, which when executed on a data processing system, instructs the data processing system to carry out the invention as described above.

DETAILED DESCRIPTION OF THE PRESENT INVENTION

When providing web services over multiple geographical locations, users generally want high availability and fast response. Moreover, all websites need to have a consistent view of the data. Thus, when data changes, the data should be replicated to all web servers that use that data. Otherwise, for example, a user of a webservice located in the UK may have different information on the availability of inventory as a user of the same webservice located in the United States. A database broker program 102, implemented as a middleware service, achieves a consistent 'global view' of the data in real time as described below. Middleware is software which executes on the operating system and allows communication between two diverse systems. The middleware service masks the heterogeneity of the different systems with their different operating systems or other differences. Middleware enables communication and sharing of resources in distributed systems. Implementing the database broker in middleware allows the database broker to be platform and vendor neutral. The database broker program 102 assumes responsibility for its own dataset within a database.

Figure 1:
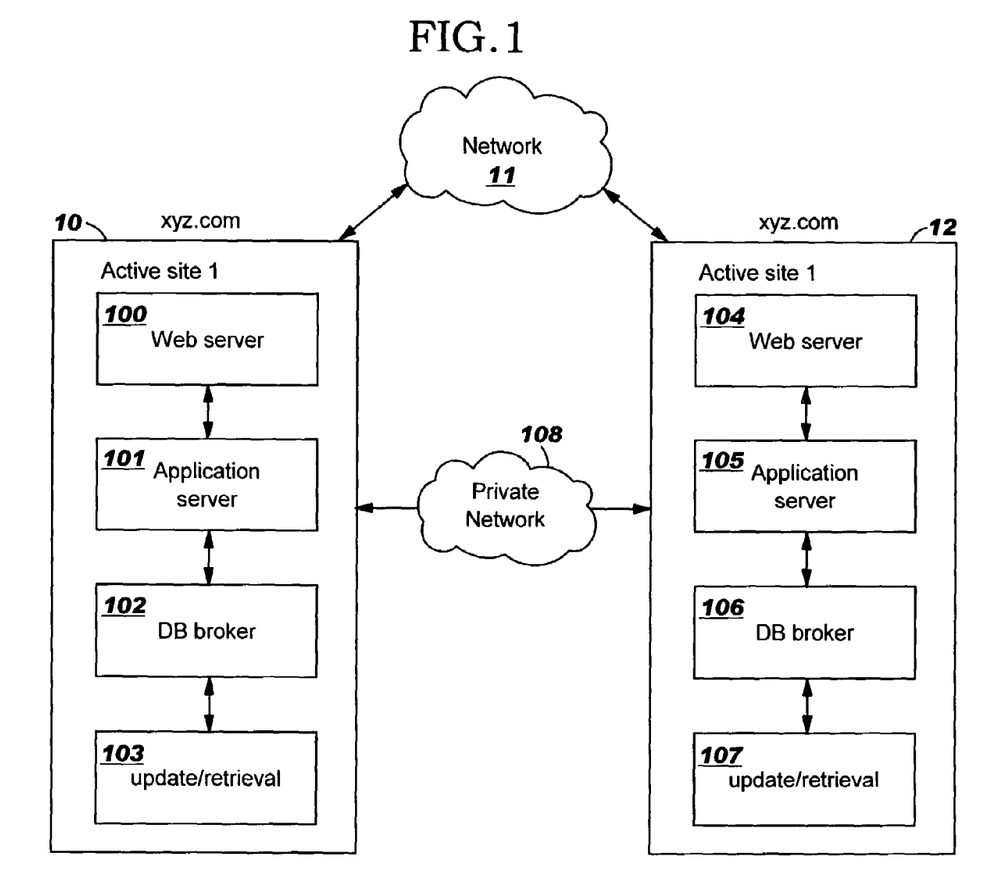
FIG. 1 is a block diagram illustrating two websites in which the present invention may be applied.

FIG. 1 illustrates a distributed web site comprising two server systems 'xyz.com' 10, 12 at two different physical locations. In the illustrated embodiment, both web server systems 10 and 12 have the same URL, and are intended to provide the same service/application with some common data to clients. However, in an alternate embodiment, the web server systems 10 and 12 have different URLs, but also use some common data. For example, in the illustrated embodiment, the web server systems 10 and 12 both have URL 'xyz.com' and may provide an on-line banking service or an on-line auction system. Web server system 10 comprises a web server 100 for serving web pages and web resources such as images, style sheets and data files. Web server system 10 also comprises an application server 101 for managing applications that are required for the one or more web services. For example, application server 101 can manage a chat interface wherein a user of a client device can ask questions to a customer service advisor at a bank over a network 11. Web server system 10 also comprises a database broker program 102 which is implemented as a middleware service for managing database updates across multiple webserver systems located at the same or different geographical locations. Web server system 10 also comprises an update/retrieval database 103 for the storage, updating and retrieval of data required by a web service. Likewise, web server system 12 comprises a web server 104 for serving web pages and web resources such as images, style sheets and data files. Web server system 12 also comprises an application server 105 for managing applications that are required for the one or more web services. For example, application server 105 can manage a chat interface wherein a user of a client device can ask questions to a customer service advisor at a bank over network 11. Web server system 12 also comprises a database broker program 106 which is implemented as a middleware service for managing database updates across multiple websites located at the same or different geographical locations. Web server system 12 also comprises an update/retrieval database 107 for the storage, updating and retrieval of data required by a web service.

Communication between database brokers 102 and 106 can occur over a private network 108 such as an Ethernet or a Fiber Optic network. The database brokers may exchange messages with each other across the private network 108 to update data. However, if desired, the database brokers 102 and 106 can communicate with each via other over other types of networks such as the Internet 11 or an Intranet.

Figure 2:
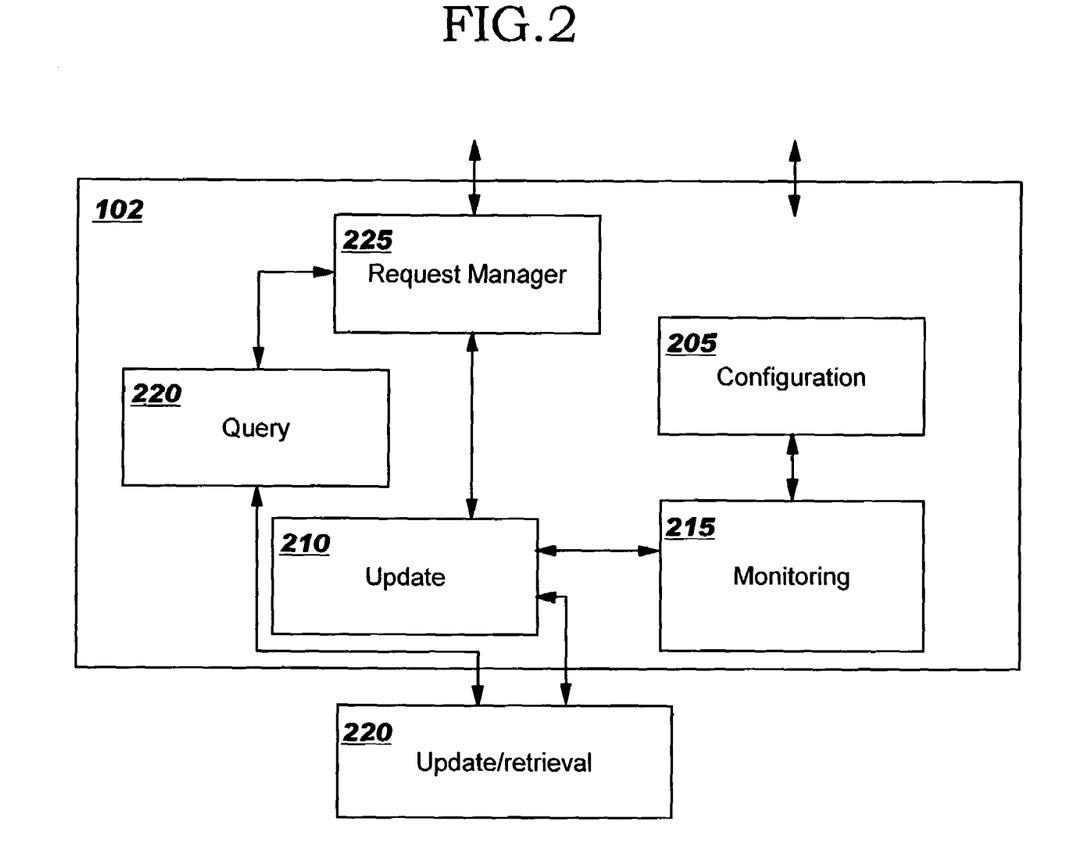
FIG. 2 is a block diagram illustrating the program components or routines of a database broker according to a preferred embodiment of the present invention.

FIG. 2 illustrates the database broker programs 102 and 106 in more detail. Each of the database broker programs comprises a request manager routine 225 to manage one or more application requests, a query routine 200 to cache data requested from update/retrieval database 220, a configuration routine 205 for storing and retrieving a 'chain of command' should a database broker fail, an update routine 210 for processing the requested updates within the system, and a monitoring routine 215 for determining whether a database broker 102, 104 is available for service. The request manager 225 processes API requests sent from the respective application server and extracts one or more data objects. The request manager 225 then routes the data objects either to the query routine 200 or the update routine 210 depending on the type of request received. The update/retrieval database 220 segments data, and stores and retrieves updates.

Figure 3:
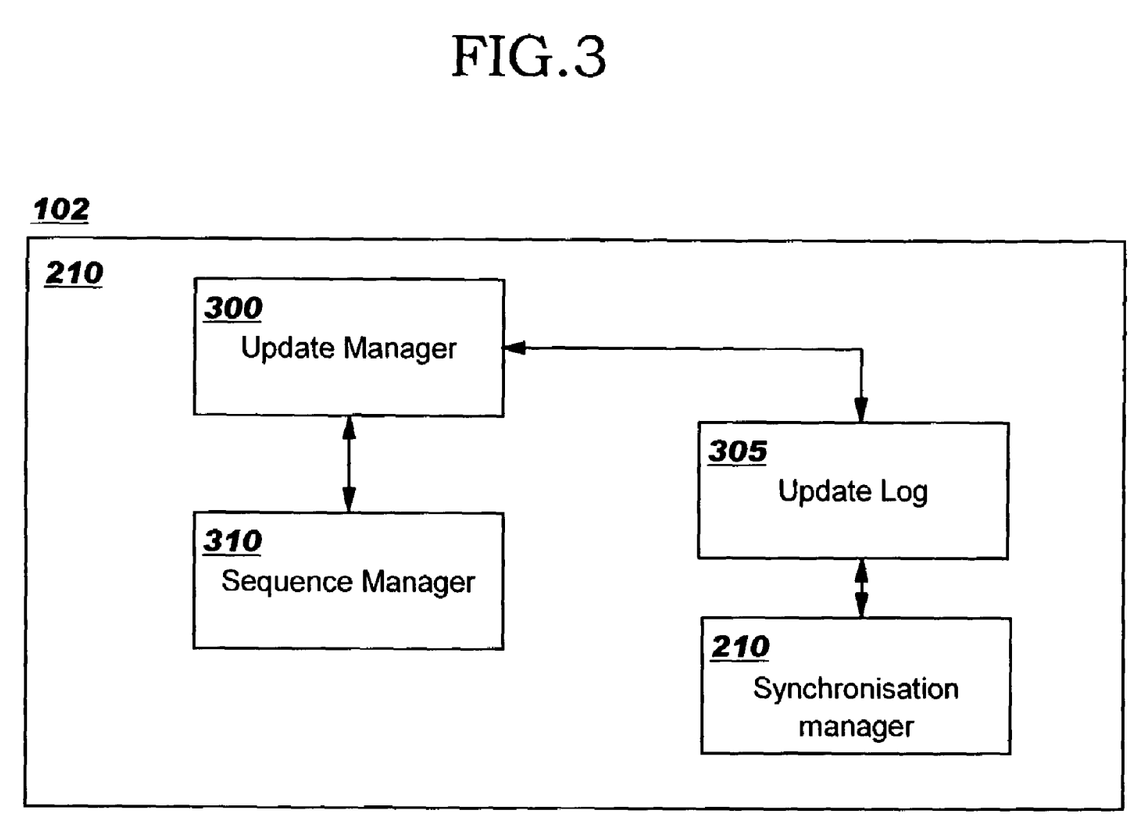
FIG. 3 is a block diagram detailing an update routine of FIG. 2 in accordance with a preferred embodiment of the present invention.

FIG. 3 illustrates in more detail the update routine 210 of the database broker program 102. The update routine 210 receives API update requests from the request manager 225 of FIG. 2. The update routine 210 comprises an update manager 300 which oversees that an update is processed correctly between the update routine 210 and the monitoring routine 215. The update manager 300 records all of its updates in an update log 305. The update log 305 comprises information on local updates performed by the receiving update manager and updates performed by other database brokers such as database broker 102 within system 10. The information within the update log 305 is accessed by a synchronization manager 415 to compare the status of a local database broker 102 with the status with one or more remote database brokers 106 within the remote system such as system 12. The synchronization manager 315 synchronizes one or more updates between one or more database brokers 102 and 106. Synchronization manager 315 responds to events received from the monitoring routine 205 and ensures that requested updates are not interleaved with another to produce inconsistent data. A sequence manager 310 generates sequence numbers which are distributed and tagged to the requested updates to ensure that an update is performed in a correct sequence.

Figure 4:
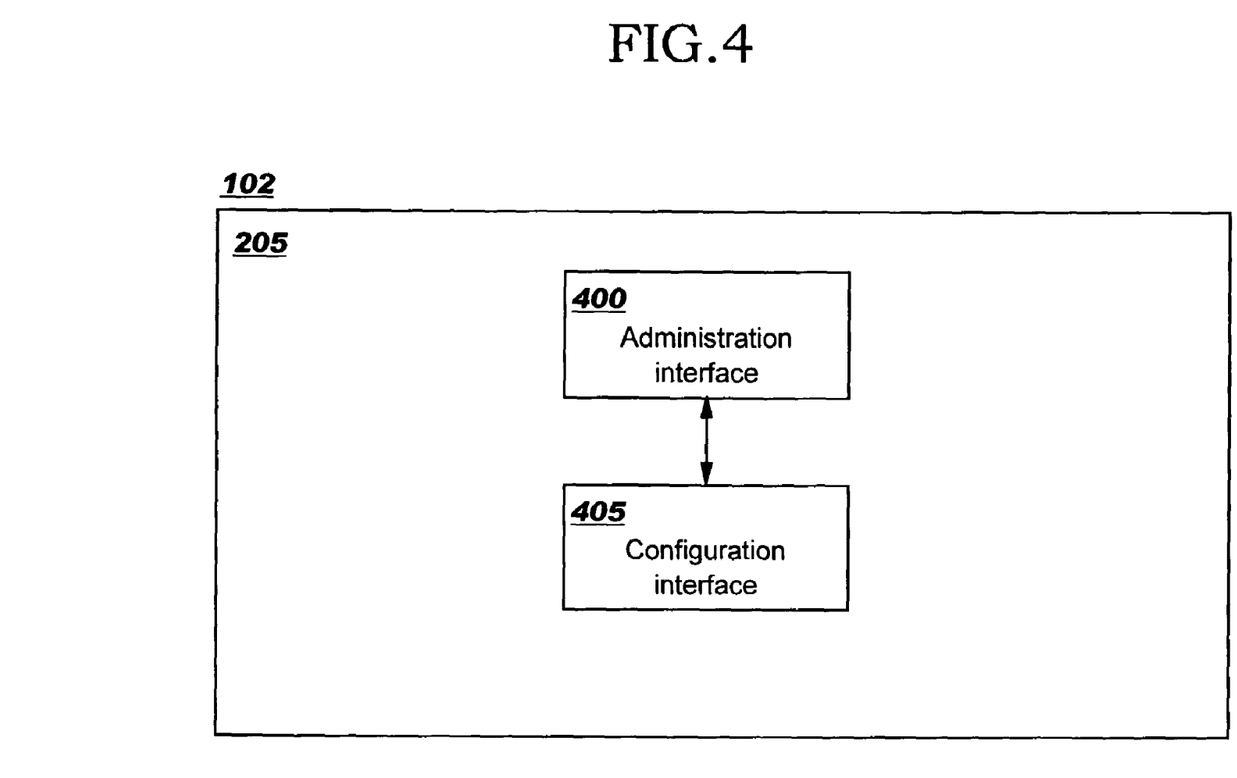
FIG. 4 is a block diagram detailing a configuration routine of FIG. 2 in accordance with a preferred embodiment of the present invention.

FIG. 4 illustrates the configuration routine 205 of FIG. 2 in more detail. The configuration routine 205 comprises a configuration manager 405 and an administration interface 400. An administration client (not shown) interfaces with the administration interface 400 to interact with configuration manager 405. The administration interface 400 reflects the configuration of the system, as managed by the configuration manager 405, based on the level of detail authorized by the administrator's credentials. Different levels and scopes of administration may be performed from a single database broker 102, to a localized domain of database brokers 102 or to all the database brokers 102, 106 that are configured across the entire system. For example, the administration of the system may be restricted to a single database broker enabling only updates to that broker to be performed, or in another example, to all brokers so that a single administrator can configure all brokers participating in the system. Each database broker 102, 106 will contain the configuration details of the entire system (in the illustrated example, both systems 10 and 12) as this information is replicated among the brokers to ensure a consistent view, as well as a distributed administration capability.

The configuration manager 405 interacts with the monitoring routine 215 and provides the configuration settings for the database brokers 102, 106. The configuration settings may comprise the name of the database broker 102, 106, the 'chain of command' should the database broker 102, 106 fail, the elapsed time since the last communication was received and how long the database broker 102, 106 has been active. The information gathered by the configuration manager 405 is accessed by the monitoring routine 215 when probing one or more database brokers 102, 106 to determine if each registered database broker 102, 106 is active.

Figure 5:
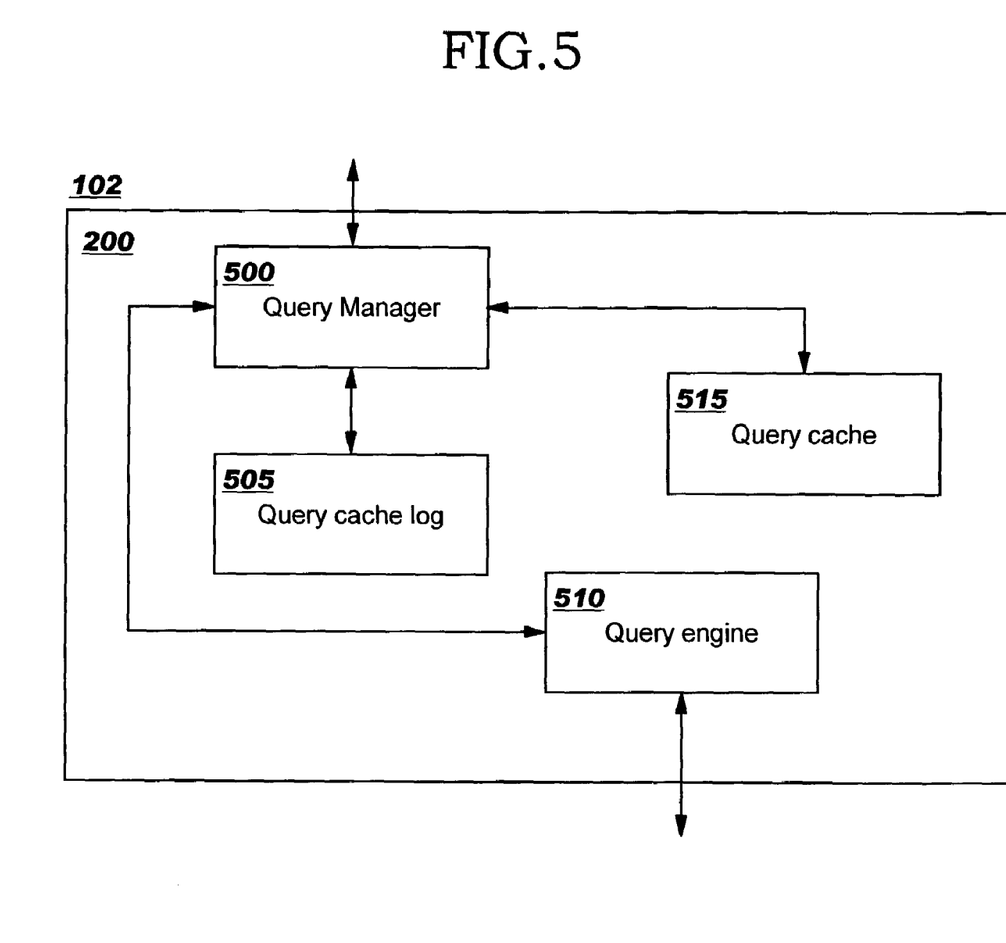
FIG. 5 is a block diagram detailing a query routine of FIG. 2 in accordance with a preferred embodiment of the present invention.

FIG. 5 illustrates the query routine 200 of FIG. 2 in more detail. The query routine 200 comprises a query manager 500, a query cache log 505, a query cache 515 and a query engine 510. The query manager 500 receives a request from a request management routine (not shown) for example, how many items of a certain type are in stock. The query manager 500 sends and receives queries to the query cache log 505. The query cache log 505 is used for pre-fetching and loading of the cache, and cache pre-loading (based on previously saved most commonly performed queries). The query manager 500 sends and receives updates from the query cache 515 for example, a cached query. In the foregoing example, the update may indicate how many of the requested items are currently in stock. The query manager 500 initially receives the query request details from the request management process 225 of FIG. 2. The query manager 500 sends and receives updates to the query engine 510. The query engine 510 processes each query, including the aggregation of one or more parallel queries performed when there are multiple data stores within the system. For example, an application issues a query to the database broker requesting the total number of the requested items which are in stock. The request is received by the request manager 225 in FIG. 2, and is passed to the query manager 500. The query manager 500 then checks the query cache 515 for recent data in the cache 515 matching the query. If the query is matched, the data is retrieved and the results are returned. If the query is not matched, either because the cache data has expired or no cached data could be matched, then the query manager 500 identifies the target database which holds the query dataset based upon information held by the resource manager 600 in FIG. 6. In this instance, the dataset is held in the common dataset, and the query manager 500 constructs the query request and passes it to the query engine 510 for processing. The query engine 510 issues the query to the common dataset and retrieves the result. This is passed back to the query manager 500, which in turn updates the query cache 515 and the query cache log 505. The query manager 500 returns the result to the application server 101.

In another embodiment of the present invention, a query is issued by the application for data contained within the local dataset. The request is received by the request manager 225 in FIG. 2, and is passed to the query manager 500. The query manager 500 checks the query cache 515 for recent data in the cache 515 matching the query. If the query is matched, the data is retrieved and the results are returned. If the query is not matched, either because the cache data has expired or no cached data could be matched, then the query manager 500 identifies the target database which holds the query dataset using the information held by the resource manager 600 in FIG. 6. In this case, the dataset is identified as being held in the local dataset, and the query manager 500 constructs the query request and passes it to the query engine 510 for processing. The query engine 510 also issues in parallel a query against every instance of the local dataset. Each query generates a response which is passed back to the query manager 500. The query manager aggregates the responses, and then updates the query cache 515 and the query cache log 505. The query manager 500 returns the result to the application.

The query cache log 505 is used by the query manager 500 to maintain a history of the queries performed. This information is collected over the operating cycle. In the event of a system restart, the query manager 500 identifies the most performed queries (the number configured by a systems administrator) and pre-fetches this data into the query cache. A master one of the database brokers 102, 106 may optionally broadcast collect the most performed queries from all the participating database brokers 102, 106 such that the entire system may be pre-loaded with the most requested data at a restart of any database broker 102, 106.

Figure 6:
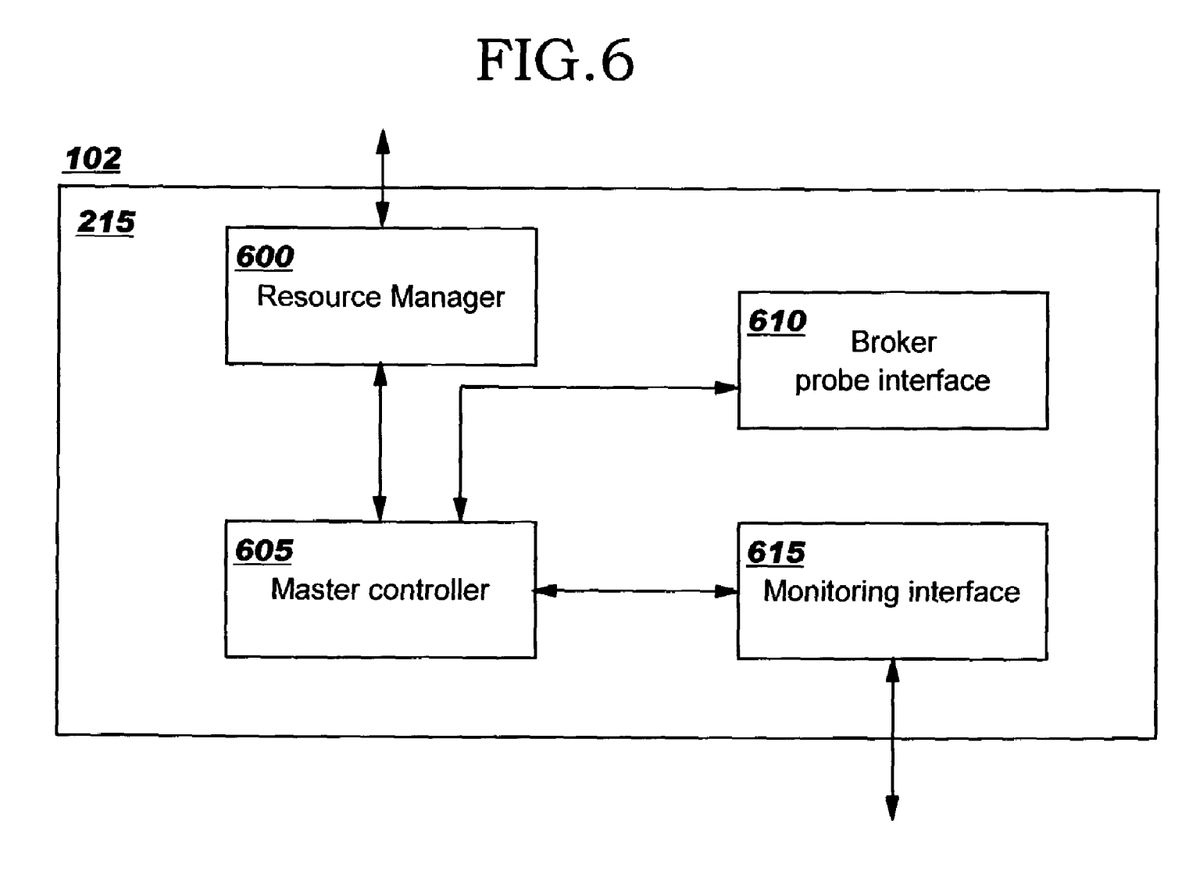
FIG. 6 is a block diagram detailing a monitoring routine of FIG. 2 in accordance with a preferred embodiment of the present invention.

FIG. 6 illustrates the monitoring routine 215 of FIG. 2 in more detail. The monitoring routine 215 receives requests from the configuration routine 205 and monitors the availability of one or more database brokers 102, 106. The monitoring routine 215 comprises a resource manager 600, a master controller 605, a broker probe interface 610 and a monitoring interface 615. The resource manager 600 centrally controls and manages the database broker 102, 106 resources such as which database brokers 102, 106 are active, what data sets are held where, and which database broker 102, 206 is a delegate for which other database brokers 102, 106. The resource manager 600 sends the resource information to the master controller 605. The master controller 605 centrally controls and manages the monitoring of one or more database brokers 102, 106, and the handling of one or more remote database broker 102, 106 failures. If a database broker 102, 106 is acting as a master, the master controller provides the central point to which all other database brokers 102, 106 publish their availability. In the event that a master database broker 102, 106 fails, then a secondary delegated master will take over this processing. The master controller 605 manages and interacts with two interfaces—the broker probe interface 610 and the monitoring interface 615. The broker probe interface 610 probes one or more remote database brokers 102, 106, and the monitoring interface 615 receives probes from other remote database brokers 102, 106. The master controller 615 also updates the resource manager 600 based on events received from one or more remote database brokers 102, 106 for example, when a database broker 102, 106 goes on or offline. Lastly, the broker probe interface 610 manages messages (send and receive functions) for the probing of one or more remote database brokers 102, 106 for example, sending a message to the master controller informing that a new database broker has joined the system.

Each of the database brokers 102 and 106 may be an add-on software module installed on an application server, connected via an API interface to an application layer. Alternately, each of the database brokers 102 and 106 may be a standalone broker service, connected via an API interface, an MQ (tm of International Business Machines Corp.) series interface or other remote access programs etc. Each of the database brokers 102 and 106 may operate in either delegated mode or master mode. Delegated mode allows the data to be distributed across multiple geographical sites.

Figure 7:
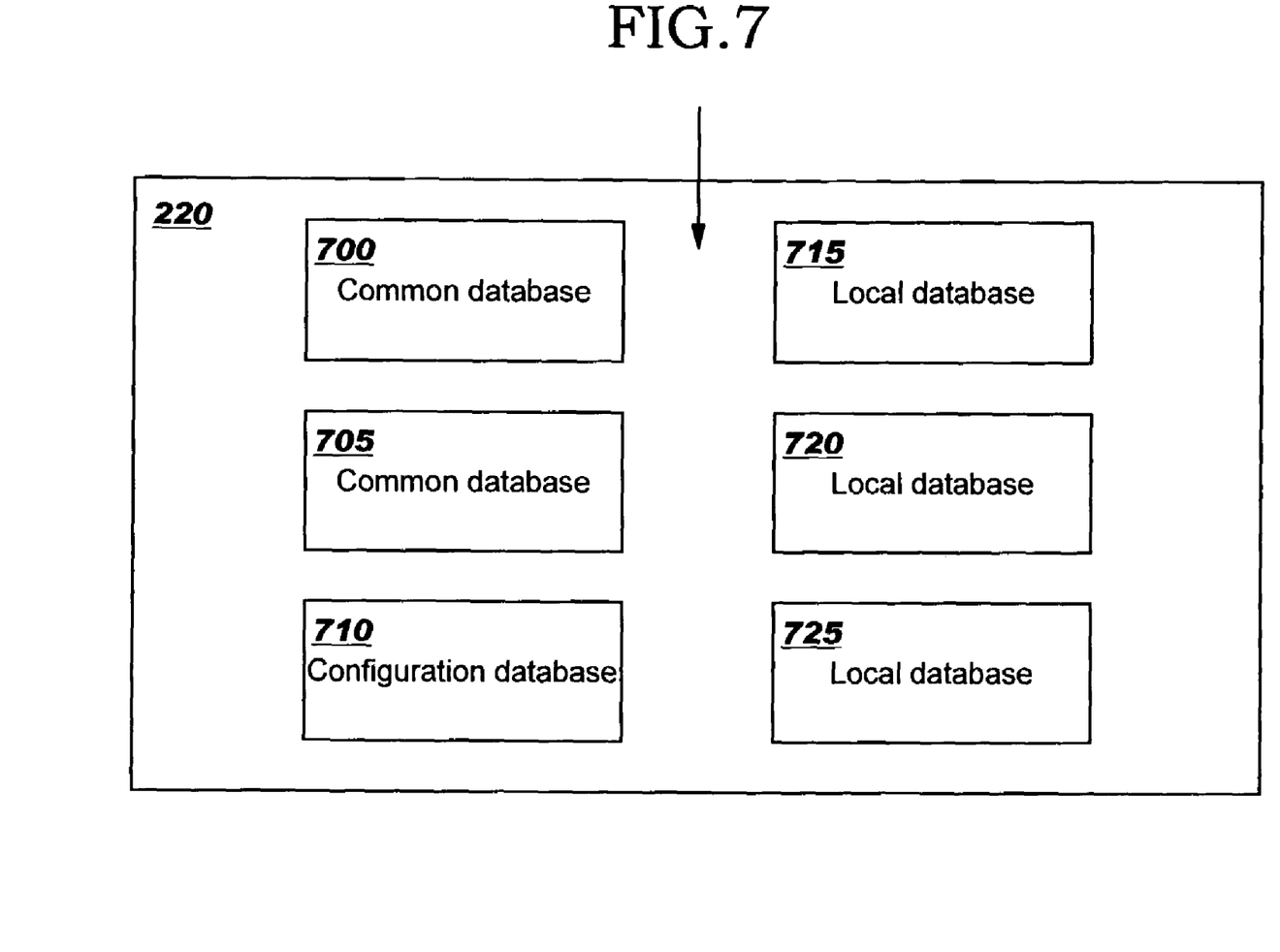
FIG. 7 is a block diagram detailing segmentation of data in a update/retrieval database of FIG. 2 in accordance with a preferred embodiment of the present invention.

Each database broker 102, 106 will hold a copy of every database required to provide a web service. Each database broker 102, 106 within a particular geographical location is delegated authority for owning a portion of the data (a dataset) in the update/retrieval database 220. In order to allow a delegate broker 102, 106 to update the data within the database, a database schema is devised such that the database may be spilt into common core data and a number of data stores (local data) which are relevant to the server providing the web service. This is illustrated in FIG. 7, wherein an update/retrieval database comprises a plurality of common databases 700, 705, a configuration database and a plurality of local databases 715 and 720.

An example of this type of database schema can be explained using an example of an on-line shop. An on-line shop will sell a variety of goods. The on-line shop may have customer bases in the United Kingdom, the United States and Italy. In this example the common data will comprise the variety of goods that the on-line store sells for example, door handles, sinks and taps, plus other information such as the quantity of these items in stock and the price of each of these items. In the delegate model only the master database broker will have the authority to update the common data for the UK, United States and Italy. The local data 715, 720 comprises data that is relevant to the server in a geographical region. Using the example of the on-line shop, the local data may be the account details of the customers i.e. their names and delivery addresses for the UK, US and Italy. The UK database broker 102 is the owner of the dataset of the UK customer account details, the US database broker 106 is the owner of the dataset for the US customer account details, and the Italian database broker is the owner of the dataset for the Italian customer account details.

In another embodiment of the present invention, the database broker 102, 106 may also work in 'master mode'. This mode requires all database updates to be authorized centrally by the master database broker 102, 106. If any of the websites are required to update a record within a dataset, the master database broker 102, 106 will be the sole arbiter for all update requests. If, at any time, the master database broker 102, 106 becomes inactive, a designated secondary database broker will assume the role of the master database broker and will authorize update requests. The designation of a secondary delegate master database broker is explained in greater detail with reference to FIG. 11.

Figure 8:
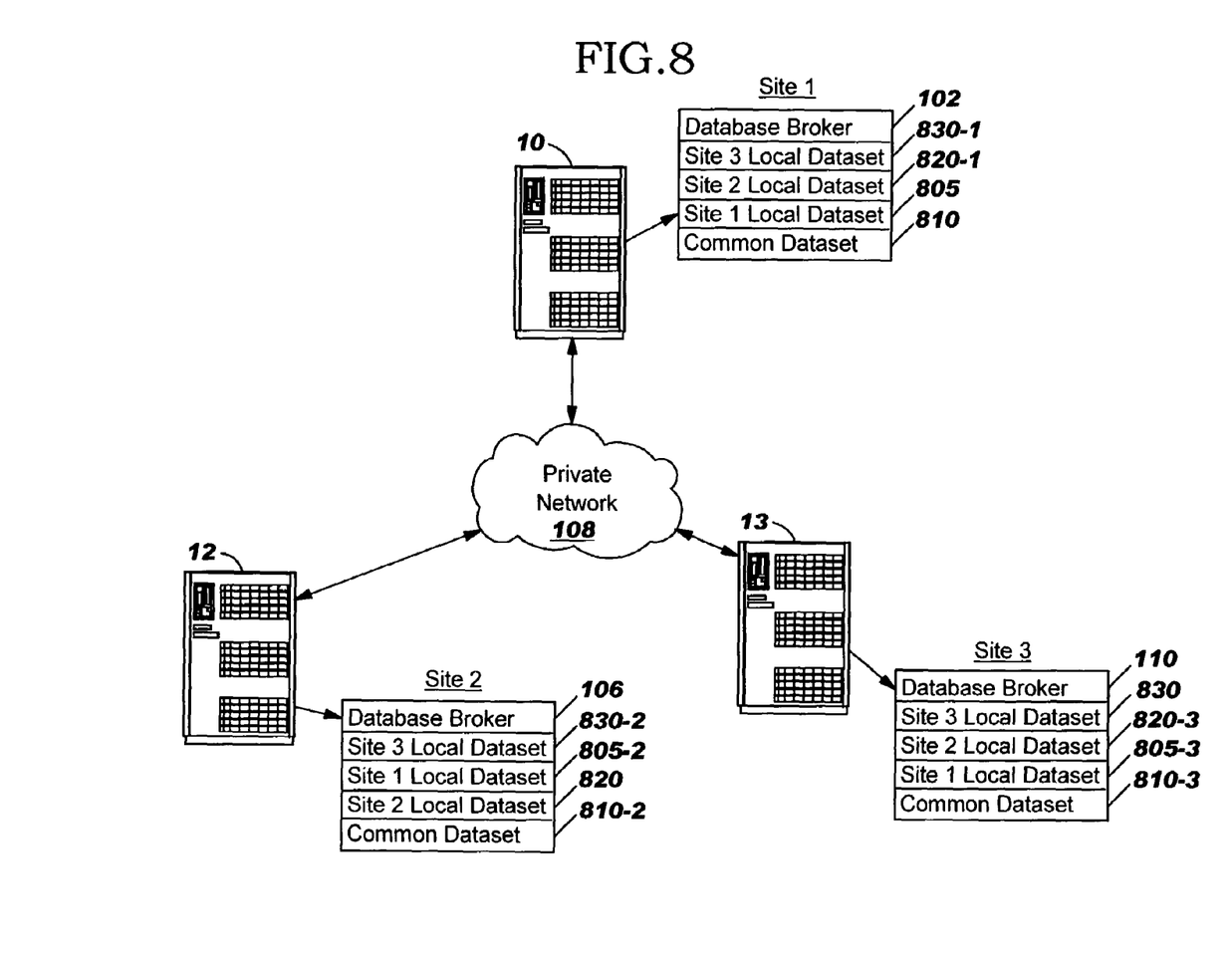
FIG. 8 is a block diagram of a plurality of geographically dispersed web sites in accordance with a preferred embodiment of the present invention.

FIG. 8 illustrates the segmentation of data at web server systems 10, 12 and 13 at different geographical locations. Web server system 13 is similar to web server systems 10 and 12 except for the content of the respective databases as described below. Web server system 13 has a master database broker 110 which operates similarly to master database brokers 102 and 106. Communication between the database brokers 102, 106 and 110 in web server systems 10, 12 and 13, respectively, is made over private network 108. For each web server system there is a common dataset 810, for example the availability of stock. The common dataset is distributed across three databases at server system 10/site 1, server system 12/site 2 and server system 13/site 3. A master database broker 102 at site 1 claims ownership of common dataset 810, i.e. only the master database broker 102 may perform updates on the common dataset 810. The database broker at site 2 and the database broker at site 3 have respective copies 810-2 and 810-3 of the common dataset 810. Database broker 106 of web server system 12/site 2 and database broker 110 of web server system 13/site 3 are required to package their updates and send them to the master database broker 102 when requesting that an update to the common dataset be performed. Master database broker 102 gives each packaged update a sequence number. Web server system 10 will perform each update in an order dictated by the sequence number. FIG. 8 also illustrates a local dataset 805 in web server system 10 for which database broker 102 in server system 10 is the owner. Server system 12 has a copy 805-2 of this dataset and server system 13 has a copy 805-3 of this dataset. FIG. 8 also illustrates a local dataset 820 in web server system 12 for which database broker 106 in server system 12 is the owner. Server system 10 has a copy 820-1 of this dataset and server system 13 has a copy 820-3 of this dataset. FIG. 8 also illustrates a local dataset 830 in web server system 13 for which database broker 110 in server system 13 is the owner. Server system 10 has a copy 830-1 of this dataset and server system 12 has a copy 830-2 of this dataset.

Figure 9:
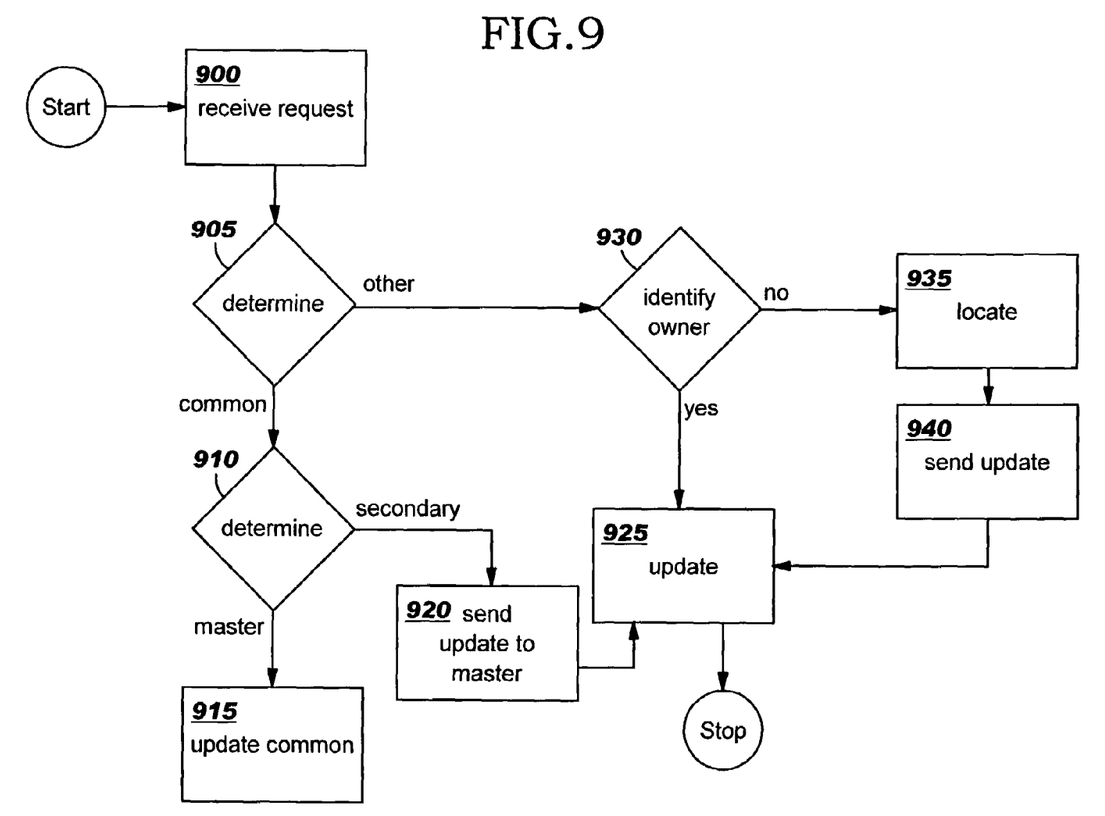
FIG. 9 is a flow chart detailing how an update is performed on a dataset by a database broker in accordance with a preferred embodiment of the present invention.

FIG. 9 illustrates the steps that a database broker performs when carrying out an update on both a common dataset and a local dataset. The database broker receives a request from the application interface at step 900. The database broker extracts the database update from request and at step 905 determines whether the database update is intended for the common database or a local database. If the database update is intended for the common database, control passes to step 910 where the database broker determines whether the database broker dealing with the current request is the master (or primary) database broker or a secondary (or slave) database broker. (Brokers other than the "master" are called "secondary" brokers.) If at step 910 it is determined that the database broker is the master database broker for the common database, control passes to step 915 and the master database broker updates the relevant record in the master common database. To ensure that all database brokers are able to view the update, a database update message is sent to all database brokers informing them of the update and a confirmation receipt is sent back to the master broker.

Returning back to step 905, if the determining step determines that the database update is for a local database, control passes to step 930 and the owner is identified for the dataset that is required to be updated. If the database broker receiving the request at step 900 is the owner of the dataset, the update can be performed on the dataset within the local database. If at step 930 the database broker receiving the request at step 900 is not the owner of the dataset, control passes to step 935 and a lookup is performed to determine who is the owner of the dataset. Then, an update message is sent to the owning database broker at step 940 requesting the dataset be updated at step 925. Returning to step 910, if it is determined that the database broker receiving the update request at step 900 is not the master broker but a secondary broker, control passes to step 920 and a request message is sent to the master of the common database requesting that the dataset be updated at step 925. A sequence number is created by the sequence manager, and an update is performed to the dataset at step 925.

Figure 10:
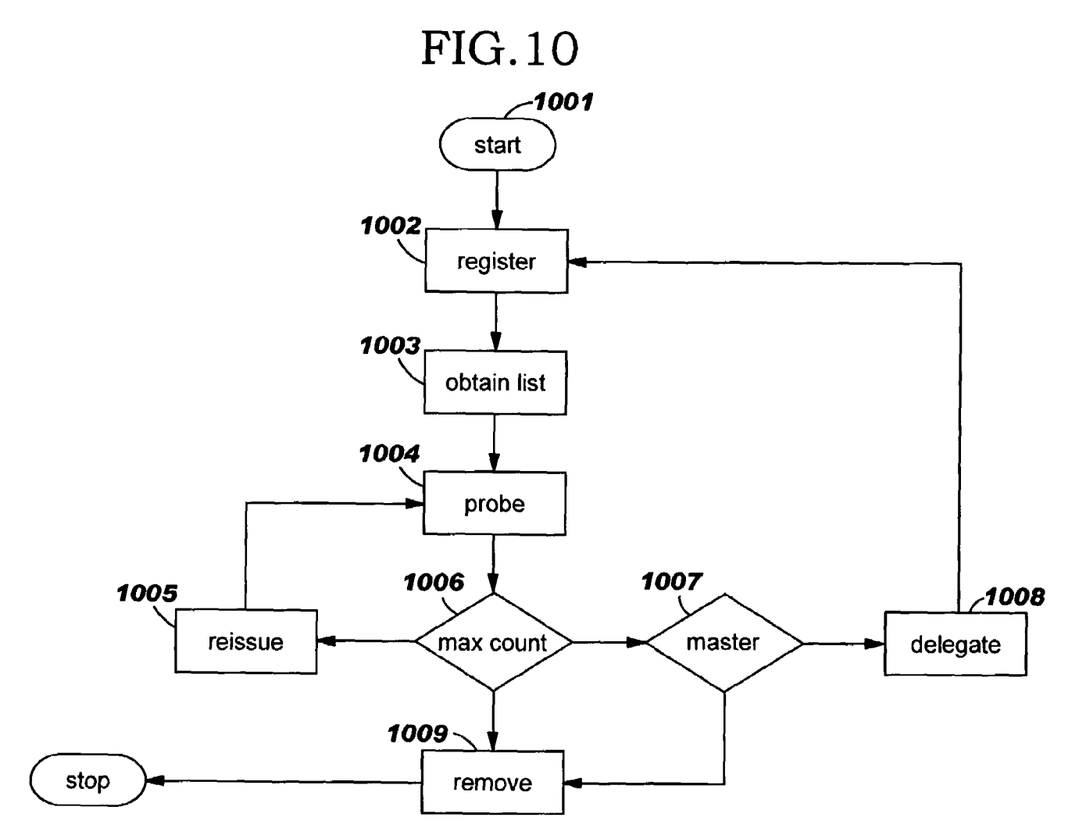
FIG. 10 is a flow chart detailing interaction between multiple database brokers.

Referring to FIG. 10, when the server is initiated at step 1001, the master database broker registers itself at step 1002 as the master database broker in the configuration database and obtains a list of registered secondary database brokers at step 1003. As other secondary database brokers can be added to the system at any time, a check is continually performed to determine if any secondary database brokers have been added. Once it has been determined that a secondary broker has been added, an active broker list and a database status list is updated with the new information. At step 1004 a probe is initiated to determine whether all the registered database brokers are active. The active list of database brokers is loaded into the system to enable the probe to monitor all active registered secondary database brokers. The probe sends a message every n seconds to each registered database broker probe in the active list to determine at step 1006 if it is still active and able to process database updates. A probe status list is created to store the status of each probe for example, whether a response has been returned to the probe. The monitoring routine receives the probe status list from the probe and determines if a response has been received from each secondary broker listed in the active list. If a response has not been received from any one of the secondary database brokers, the monitoring routine determines if a probe has reached its maximum allotted time at step 1006 in which to respond for example, twenty milliseconds. If the secondary database broker has not reached its maximum allotted time control passes to step 1005 and the probe is re-issued. If it has reached its allotted time and no response has been received, control passes to step 1009 and the secondary database broker is removed from the active list and the status is updated in the database status list. If the probe does not receive a response, a further check is carried out at step 1007 to determine if it is the master database broker or a secondary database broker that is failing. Once it has been determined that it is the master database broker that is failing, a new master delegate is located from the delegate configuration database at step 1008, and the new master delegate broker is located. Then, the new master delegate broker registers itself with the configuration database, and all other active database brokers are informed of the update.

Figure 11:
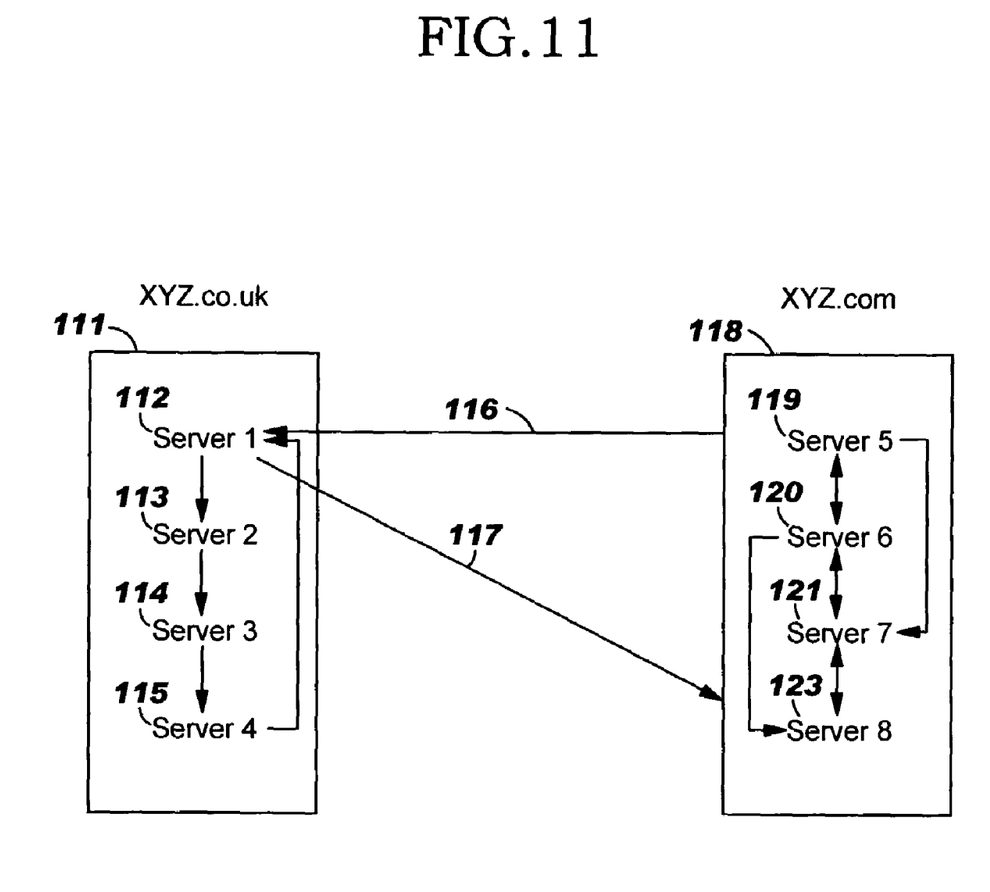
FIG. 11 is a block diagram detailing one or more relationships that may be created between one or more database brokers, in accordance with a preferred embodiment of the present invention.

The database broker architecture is resilient and supports failover through the chain of command when one of the web sites or web services is lost, i.e. if the master database broker is lost, then the master database broker hands to a designated secondary broker authority to update the common database. The designated secondary broker then takes over the role as the master database broker. The chain of command as stored in the configuration database comprises a plurality of hierarchical relationships which may be created between different database brokers 102, 106. For example, FIG. 11 illustrates web site XYZ.co.uk 111 which uses four web servers: server 112, server 113, server 114 and server 115. In this example, the database broker of server 112 is registered as the master server. The database brokers of server 113, server 114 and server 115 are all registered in the configuration database as delegate brokers and loaded into the active list as active delegate brokers. The active list further defines the relationships between the delegate brokers. For example, if server 112 fails, it is possible to define that server 113 will take over the role of the master server from server 112 if the probe establishes that server 112 is no longer active. Using the example in FIG. 11, the same rules may be defined for server 113, server 114 and server 115. If it is found at step 1007 of FIG. 10 that server 113 is failing, the database broker of server 114 can register itself as the master broker and take over from server 113. The same applies to the database brokers of server 114 and server 115.

More complicated relationships can be defined, for example, with reference to the website XYZ.com 118 of FIG. 11. Server 119 is registered as the master broker. If the probe finds that server 119 is failing, control passes to the database broker of server 121 or server 120 depending on which one is available. If the database broker of server 120 assumes responsibility as the master database broker, server 121 or server 123 may take over depending on availability.

It will be appreciated by a person skilled in the art that any number of relationships can be created not just within one website in one geographical location but relationships across multiple geographic locations for example US and UK locations.

The invention claimed is:

1. A method for maintaining common data in first, second and third datasets in first, second and third respective computer systems, said method comprising the steps of:

assigning said first computer system a sole right to approve updates of said common data while said first computer system is able to approve updates of said common data, and assigning said second computer system a right to approve updates of said common data when said first computer system is unable to approve updates of said common data;

said third computer system subsequently making a request to said first computer system to update said common data, and in response, said first computer system updating said common data in said first dataset and advising said second and third computer systems to make a corresponding update to their second and third datasets, respectively;

said third computer system making a subsequent request to said first computer system to update said common data, and in response, said third computer system learning that said first computer system is unable to approve updates of said common data and determining that said second computer system has a right to approve updates of said common data when said first computer system is unable to approve updates of said common data, and in response, said third computer system making a request to said second computer system to update said common data and notifying said second computer system that said first computer system is unable to approve updates of said common data or that said second computer system has the right to approve updates of said common data; and in response to said notification, said second computer system updating said common data in said second dataset and advising said third computer system to make a corresponding update to said third dataset.

2. A method as set forth in claim 1 wherein said third computer system maintains a table indicating that said first computer system has the sole right to update said common data when able and said second computer system has the right to update said common data when said first computer system is unable to update said common data.

3. A method as set forth in claim 2 wherein said table also indicates that said second computer system has the sole right to update said common data when said first computer system is unable to update said common data.

4. A method as set forth in claim 1 wherein said second computer system has the sole right to update said common data when said first computer system is unable to update said common data.

5. A method as set forth in claim 1 wherein each of said computer systems communicates with each of the other computer systems via a network.

6. A method as set forth in claim 5 wherein said network is the Internet, and said common data can be accessed by a user via a web browser.

7. A method as set forth in claim 1 wherein:

the assigning steps are performed by assigning a first program within said first computer system the sole right to update said common data while said first computer system is able to update said common data, and assigning a second program within said second computer system the right to update said common data when said first computer system is unable to update said common data.

8. A method as set forth in claim 7 wherein said first program is part of a first middleware program within said first computer system, said second program is part of a second middleware program within said second computer system, and said third program is part of a third middleware program within said third computer system.

9. A method as set forth in claim 8 wherein said first dataset is managed by a database manager program of a first type and said second dataset is managed by a database manager program of a second, different type, such that said first database manager program would be incompatible with said second database manager program without said first or second middleware program to act as a protocol interface.

10. A method as claimed in claim 1 wherein said first computer system maintains a log of most often performed queries for said common data.

11. A method as claimed in claim 10 wherein said first computer system notifies said second computer system of said most often performed queries for said common data.

12. A method as set forth in claim 11 wherein in response to said notification from said first computer system of said most often performed queries, said second computer system caches the common data which is subject of said most often performed queries.

13. A distributed computer system for maintaining common data in first, second and third datasets in first, second and third respective computer systems, said distributed computer system comprising:
said first computer system including means for assigning a sole right to approve updates of said common data while said first computer system is able to approve updates of said common data, and assigning said second computer system a right to approve updates of said common data when said first computer system is unable to approve updates of said common data;
said third computer system including means for subsequently making a request to said first computer system to update said common data, and in response, said first computer system including means for updating said common data in said first dataset and advising said second and third computer systems to make a corresponding update to their second and third datasets, respectively;
said third computer system including means for making a subsequent request to said first computer system to update said common data, and in response, said third computer system including means for learning that said first computer system is unable to approve updates of said common data and determining that said second computer system has a right to approve updates of said common data when said first computer system is unable to approve updates of said common data, and in response, said third computer system including means for making a request to said second computer system to update said common data and notifying said second computer system that said first computer system is unable to approve updates of said common data or that said second computer system has the right to approve updates of said common data; and
in response to said notification, said second computer system including means for updating said common data in said second dataset and advising said third computer system to make a corresponding update to said third dataset.

14. A computer program product for maintaining common data in first, second and third datasets in first, second and third respective computer systems, said computer program product comprising:
one or more computer readable medium;
first program instructions for execution within said first computer system to assign a sole right to approve updates of said common data while said first computer system is able to approve updates of said common data, and assign said second computer system a right to approve updates of said common data when said first computer system is unable to approve updates of said common data;
second program instructions for execution within said third computer system to subsequently make a request to said first computer system to update said common data, and in response, third program instructions for execution within said first computer system to update said common data in said first dataset and advise said second and third computer systems to make a corresponding update to their second and third datasets, respectively;
fourth program instructions for execution within said third computer system to make a subsequent request to said first computer system to update said common data, and in response, fifth program instructions for execution within said third computer system to learn that said first computer system is unable to approve updates of said common data and determine that said second computer system has a right to approve updates of said common data when said first computer system is unable to approve updates of said common data, and in response, sixth program instructions for execution within said third computer system to make a request to said second computer system to update said common data and notify said second computer system that said first computer system is unable to approve updates of said common data or that said second computer system has the right to approve updates of said common data; and
in response to said notification, seventh program instructions for execution within said second computer system to update said common data in said second dataset and advise said third computer system to make a corresponding update to said third dataset; and wherein
said first, second, third, fourth, fifth, sixth and seventh program instructions being recorded on said one or more computer readable medium.

15. A method for maintaining common data in first and second datasets in first and second respective computer systems, said method comprising the steps of:
assigning said first computer system a sole right to approve updates of said common data while said first computer system is able to approve updates of said common data, and assigning said second computer system a right to approve updates of said common data when said first computer system is unable to approve updates of said common data;
said second computer system subsequently making a request to said first computer system to update said common data, and in response, said first computer system updating said common data in said first dataset and advising said second computer system to make a corresponding update to said second dataset;
said second computer system making a subsequent request to said first computer system to update said common data, and in response, said second computer system learning that said first computer system is unable to approve updates of said common data and determining that said second computer system has a right to approve updates of said common data when said first computer system is unable to approve updates of said common data, and in response, said second computer system updating said common data in said second data set corresponding to said subsequent request.

16. A method as set forth in claim 15 wherein subsequently said first computer system being able to update said common data in said first data set, and said second computer learning that said first computer is able to update said common data in said first data set and notifying said first computer system to update said common data in said first dataset corresponding to said subsequent request.

17. A method as set forth in claim 15 further comprising the subsequent step of said second computer notifying said first computer system to update said common data in said first dataset corresponding to said subsequent request.

* * * * *